United States Patent [19]
Garnett et al.

[11] Patent Number: 6,162,511
[45] Date of Patent: Dec. 19, 2000

[54] METHOD OF COATING AND COMPOSITIONS FOR USE THEREIN

[75] Inventors: John Lyndon Garnett, Longueville; Allan Darley Matthews, Coogee, both of Australia

[73] Assignee: Ballina Pty. Ltd., Longueville, Australia

[21] Appl. No.: 09/180,990

[22] PCT Filed: May 20, 1997

[86] PCT No.: PCT/AU97/00307

§ 371 Date: Nov. 19, 1998

§ 102(e) Date: Nov. 19, 1998

[87] PCT Pub. No.: WO97/44140

PCT Pub. Date: Nov. 27, 1997

[30] Foreign Application Priority Data

| May 20, 1996 | [AU] | Australia | PN9943 |
| Aug. 9, 1996 | [AU] | Australia | PO1518 |
| Sep. 10, 1996 | [AU] | Australia | PO2225 |
| Oct. 14, 1996 | [AU] | Australia | PO2930 |
| Feb. 26, 1997 | [AU] | Australia | PO5296 |
| Mar. 7, 1997 | [AU] | Australia | PO5502 |

[51] Int. Cl.⁷ .................................................. C08J 7/18
[52] U.S. Cl. ................ 427/514; 106/285; 106/400; 252/600; 427/299; 427/385.5; 427/558; 427/559; 427/595
[58] Field of Search ........................... 427/508, 514, 427/558, 559, 595, 299, 385.5; 106/285, 400; 252/600

[56] References Cited

U.S. PATENT DOCUMENTS

| 4,264,483 | 4/1981 | Laufer et al. . | |
| 4,438,177 | 3/1984 | Potter et al. | 428/355 |
| 4,808,443 | 2/1989 | Minamoto et al. . | |
| 5,093,306 | 3/1992 | Mukoyoshi et al. | 503/227 |
| 5,368,884 | 11/1994 | Yamagami et al. | 427/96 |
| 5,460,856 | 10/1995 | O'Lenick . | |
| 5,683,837 | 11/1997 | Roberts et al. . | |
| 5,800,884 | 9/1998 | D'Anna et al. . | |
| 5,843,621 | 12/1998 | Schafer | 430/273.1 |

FOREIGN PATENT DOCUMENTS

| 82862/87 | 6/1988 | Australia | C03C 17/36 |
| 195 16 193 A1 | 11/1995 | Germany | H05K 3/00 |
| 403042283 | 2/1991 | Japan . | |
| WO94/27189 | 11/1994 | WIPO | G03F 7/16 |
| WO94/27190 | 11/1994 | WIPO | G03F 7/16 |

OTHER PUBLICATIONS

Copy of PCT International Search Report for PCT/AU97/00307 dated Jul. 11, 1997.

*Primary Examiner*—Bernard Pianalto
*Attorney, Agent, or Firm*—Fish & Richardson P.C.

[57] ABSTRACT

A method of preparing a coated substrate comprising: providing a radiation curable composition comprising a resin component including an unsaturated monomer and an unsaturated oligomer, binder or mixture of oligomer and binder; applying the radiation curable composition at a temperature in the range of from 35 to 150° C. to the substrate; and subjecting the applied coating to radiation to thereby cure the coating. The invention also provides a composition for application of pigmented finishes and a method of coating in which a radiation curable composition is applied to a wet substrate.

22 Claims, No Drawings

METHOD OF COATING AND COMPOSITIONS FOR USE THEREIN

The invention relates to coatings and in particular to a method of coating and to coating compositions.

Commonly used coatings are composed of resins or polymers, and one or more of solvents (except in the case of powder coating) together with pigments or filler components and other additives to provide stability or other desirable properties. The traditionally used coatings are classified into thermoplastic and thermosettable coatings and more recently radiation curable coatings have been used in some applications. Ideally a coating composition should allow quick curing, have good film forming properties and provide good adhesion to the substrate.

Thermoplastic, thermosetting and radiation curable compositions require the presence of solvent or diluent to reduce the viscosity and provide film formation. In the case of radiation curable compositions the diluent is generally in the form of a monomer which on curing is incorporated into the polymer network. Thermosetting and radiation curable compositions require less solvent or diluent however higher solids contents reduce storage stability, film forming properties and produce less efficient curing. These problems are further exacerbated when significant proportions of filler or pigment are present.

We have now found that good coating adhesion and uniformity can be provided even in the presence of high filler and pigment content by applying a radiation curable coating at a temperature above ambient temperature.

We have also found that when the coating is to be applied to a wettable substrate that a significant improvement in coating properties are provided when the coating is applied to the substrate when wet. The use of a wet substrate surface leads to more efficient use of the coating and generally provides improved adhesion.

Accordingly we provide a method of preparing a coated substrate comprising:
  providing a radiation curable composition comprising a resin component including an unsaturated monomer and at least one of an unsaturated prepolymer and binder or mixture thereof;
  applying the radiation curable composition at a temperature above ambient temperature, preferably from 35° C. to 150° C. to the substrate; and
  curing the coating by subjecting the coating to radiation.

The radiation curable composition is applied to the substrate at a temperature above ambient temperature and preferably in the range of from 35 to 150° C. More preferably the temperature is from 50 to 120° C. and most preferably from 60 to 80° C.

The composition is preferably curable by electron beam or ultraviolet radiation. UV curable compositions are preferred due to convenience and the cost advantage provided by UV-curing techniques. UV curable compositions may include a photoinitiator.

Throughout the description and claims of this specification, the word "comprise" and variations of the word, such as "comprising" and "comprises", is not intended to exclude other additives or components or integers.

The method of the invention provides considerable advantages in application of coatings containing pigment. The use of significant quantities of fillers or pigments tends to mask penetration of UV light significantly reducing the quality of resultant coating. Radiation curing of pigmented systems in air especially for exterior use, has proved to be particularly difficult. The presence of air results in surface inhibition reducing the quality, adhesion and durability of the cured coating. Although curing under nitrogen reduces these difficulties the use of nitrogen is inconvenient and increases the expense of forming coatings. Furthermore previous attempts to coat substrates using UV curable coatings have generally required the use of relatively thin coatings of for example 10 microns. The formation of thicker coatings has therefore required the application of a number of layers. We have now found that the process of the present invention, particularly when used in conjunction with particular photoinitiators, allows radiation curable coating to be applied even at significant thicknesses such as 30 microns or more and with high pigment or filler loadings. This enables a better coverage density to be obtained than was generally previously practicable with radiation curable coatings. Furthermore the affects of oxygen inhibition are reduced.

Accordingly in a preferred embodiment of the invention radiation curable coating composition comprising:
  a resin composition including a monomer and at least one of a prepolymer and binder polymer or mixture thereof;
  a pigment or filler preferably present in an amount of at least 40 parts of the total of the filler and pigment per 100 parts by weight of resin component; and
  a photoinitiator component comprising a combination of an acyl phosphine oxide initiator and an α-hydroxy-α, α-di-substituted acetophenone initiator.

In coating composition the total of the filler and pigment components may in some cases be up to about 1000 parts based on 100 parts by weight of the resin component.

Preferably the coating composition will contain in the range of from 50 to 400 parts by weight of total of pigments and fillers per 100 parts by weight of resin component.

The radiation curable coating composition will generally comprise an ethylenically unsaturated monomer. Examples of ethylenically unsaturated monomers include:
  unsaturated carboxylic acids and esters particularly acrylate and methacrylate esters;
  acrylamides, allyl compounds such as diallyl phthalate;
  maleic acid, maleic anhydride, maleimide and derivatives, fumaric acid, and their esters and amides;
  and other unsaturated compounds such as vinyl toluene, divinyl benzene, N-vinylcarbazole and N-vinylpyrrolidone.

The preferred monomers are monomers comprising a plurality of acrylate or methacrylate functional groups which may be formed, for example, from polyols or the like. Examples of such multifunctional acrylates include trimethylolpropane triacrylate (TMPTA) and its ethoxylated derivative, neopentyl glyol diacrylate, tripropyleneglycol diacrylate (TPGDA), hexanediol diacrylate (HDDA) and polyethyleneglycol diacrylates such as that formed from PEG 200. The molecular weight of the monomer will typically be less than 2000.

The radiation curable coating compositions will generally contain a prepolymer or binder polymer or mixtures thereof. The prepolymer may, for example, comprise one or more oligomer selected from ethylenically unsaturated polyesters, ethylenically unsaturated polyethers, ethylenically unsaturated polyurethanes, ethylenically unsaturated epoxy, oligoester (meth)acrylates and ethylenically unsaturated poly (meth)acrylates and modified products thereof. Typical of prepolymers which may be used are acrylated oligomers selected from polyurethane, epoxy, polyesters, polyethers and copolymers and block copolymers thereof.

Such prepolymers are described in the text UV Curing: Science and Technology Volumes I and II (Edited by S. Peter Pappas) and are commercially available from companies such as UCB, Sartomer and Ballina Pty. Ltd. Vinyl ether oligomers such as those supplied by ISP and Allied Signal Inc. may also be used. Binder polymers are generally of higher molecular weight than prepolymers and include polymers such as polystyrene, polyesters such as those used in the manufacture of fibre glass sheeting and formed by reaction of unsaturated acids and polyols, polyacrylamides, polyvinyl acetate, polyvinylpyrrolidones, acrylonitrile butadiene styrene (ABS) and cellulose derivatives. It is particularly preferred that the binder polymer be soluble in the monomer component or the mixture of the monomer component, oligomer and other additives at the temperature of application. The molecular weight of the prepolymer and binder polymer is typically in the range of from 2000 to 200,000 and preferably from 5000 to 100,000.

The weight ratio of monomer to the prepolymer and binder will generally be in the range of from 97.5:2.5 to 2.5:97.5. In high gloss, matt and semi gloss coatings it is often preferred to use a high proportion of oligomer for example a monomer oligomer weight ratio of 1:1 to 1:40. In some applications however, such as cement sheet it may be more economical to use a higher proportion of monomer for example a monomer oligomer and binder weight ratio of 1:1 to 40:1.

When the method of the invention utilises radiation in the form of ultra violet light (UV) then it may be preferred to include a photoinitiator in the coating composition. Examples of photoinitiators include benzoin ethers such as $\alpha,\alpha$-dimethoxy-$\alpha$-phenylacetophenone (DMPA), $\alpha,\alpha$-diethoxyacetophenone; $\alpha$-hydroxy-$\alpha,\alpha$-dialkylacetophenones such as $\alpha$-hydroxy-$\alpha,\alpha$-dimethyl acetophenone and 1-benzoylcyclohexanol; acyl phosphine oxides such 2,4,6-trimethylbenzolyl diphenyl phosphine oxide and bis-(2,6-dimethoxybenzoyl)-2,4,4-trimethylphenyl phosphine; cyclic photoinitiators such as cyclic benzoin methyl ethers and benzil ketals; cyclic benzils; intermolecular hydrogen abstraction photoinitiators such as benzophenone, Michler's ketone, thioxanthones, benzil and quinones; and 3-ketocoumarins.

The photoinitiator component may also be used in combination with an amine coinitiator particularly a tertiary amine coinitiator. This is particularly preferred in the case of the intermolecular hydrogen abstraction photoinitiators such as benzophenone. The amine is generally triethanolamine or an unsaturated tertiary amine such as dimethylaminoethyl acrylate, diethylaminoethylacrylate or the corresponding methacrylates. An amine/acrylate adduct such as that sold under the trade name Uvecryl 115 by Tollchem Pty. Ltd. Australia is also useful as a coinitiator. Where the unsaturated amine is used it will of course contribute to the monomer or prepolymer component.

The amount of initiator is typically in the range of from 0 to 60 parts by weight based on 100 parts by weight of the resin component and when used amounts in the range of 0.1 to 15 parts by weight are more preferred.

In the case of compositions to be cured by electron beam radiation a photoinitiator is not necessary.

In the case of pigmented compositions the composition of the invention generally contains an $\alpha$-hydroxy-$\alpha,\alpha$-disubstituted acetophenone and an acyl phosphine initiator. The most preferred $\alpha$-hydroxy-$\alpha,\alpha$-disubstituted acetophenone is 1-hydroxycyclohexyl phenyl ketone and the most preferred acyl phosphine oxide is bis-(2,6-dimethoxybenzoyl)-2,4,4-trimethylpentyl phosphine oxide. Preferably the phosphine oxide and acetophenone component will be present in a weight ratio of from 1:10 to 10:1.

Most preferably the initiator is a mixture of bis-(2,6-dimethoxybenzoyl) and 1-hydroxycyclohexyl phenyl ketone in a weight ratio of 25:75 to 50:50. Ciba products IRGACURE 1800 and IRGACURE 1850 are examples of suitable commercially available initiators.

The excellent performance of coatings formed according to the invention was unexpected as radiation curable compositions particularly those containing a significant proportion of oligomers and binders were not expected to be thermally stable enough for heated application particularly in the presence of free radical initiators and pigments and/or fillers. Application at above ambient temperature in combination with the particular photoinitiator allows excellent coverage and adhesion to be obtained even with substantial proportions of filler.

Examples of pigments which may be used in the compositions of the invention include white pigments such as titanium dioxide, colour pigments and inert pigments.

Examples of fillers include talc, calcium carbonate, silica or any of the other conventional fillers used in coating compositions or mixtures of such fillers.

The coating compositions used in the process of the invention may include water, solvents or other additives to control viscosity. When the compositions would otherwise have a very high viscosity due to the proportion of high molecular weight unsaturated components and/or fillers, solvents may allow spray application.

Propylene glycol monomethyl ether acetate (PGMA) is a particularly useful solvent and may be used as a solvent alone or in addition to water. Where water compatibility is not necessary, solvents other than PGMA may be preferred. Preferably the solvent is used in an amount of from 0 to 100 parts by weight per 100 parts by weight of the unsaturated component.

Wetting agents provide a particularly useful viscosity control when pigments or fillers are used. Suitable wetting agents are commercially available and include products sold under the brand names "Dysperbyk 110", Dysperbyk 161" and BYK 361". Other flow, slip and gloss improvers including silanes such as the Z6020 brand available from the Dow Chemical Company and fluorinated compounds such as the FC 430 brand available from The 3M Company may also be used. The flow additive when used will preferably be present in an amount of up to 10 parts by weight based on 100 parts by weight of the resin component.

In one preferred embodiment of a composition for use in accordance with the invention contains a water compatible prepolymer, particularly a urethane acrylate prepolymer; an unsaturated monomer; from 50 to 1000 parts based on 100 parts by weight of the resin components of one or more pigment and/or fillers; and water in an amount of from 5 to 100 parts by weight (preferably from 5 to 20 parts and most preferably 5 to 15 parts) based on 100 parts of the unsaturated resin component.

This embodiment has the significant advantage, where high amounts of filler are used, that it enables the use without solvent and their associated health and environmental problems to be avoided.

The use of urethane acrylates, such as those acrylated polyurethanes containing a plurality of polymer groups such as polyether and polyester group linked through urethane linking groups, is preferred. Acrylate or methacrylate groups will generally be present at each end of the prepolymer.

The composition used in the method of the invention may include a thermal polymerisation inhibitor such as di-t-butyl-p-cresol, hydroquinone, benzoquinone or their derivatives and the like. Di-t-butyl-p-cresol is preferred. The amount of thermal polymerisation inhibitor is typically up to 10 parts by weight relative to 100 parts by weight of the resin component.

The composition may contain an ultraviolet light stabiliser which may be a UV absorber or a hindered amine light stabiliser (HALS). Examples of UV absorbers include the benzotriaziols and hydroxybenzophenones. The most preferred UV stabilisers are the HALS such as bis-(1,2,2,6,6-pentamethyl-4-piperidyl)sebacate which is available from Ciba as TINUVIN 292 and a poly[6-1,1,3,3-tetramethylbutyl)imino-1,3,5-triazin-2,4-diyl] [2,2,6,6-tetramethyl-4-piperidyl)imino]hexamethylene [2,2,6,6-tetramethyl-4-piperidyl)imino] available from Ciba under the brand name TINUVIN 770. The amount of UV stabiliser which is effective will depend on the specific compounds chosen but typically up to 20 parts by weight relative to 100 parts by weight of resin component will be sufficient.

The UV stabiliser may be used simply to provide UV protection to the coating applied in accordance with the invention in which case up to 10 parts by weight will generally be adequate and in the case of HALS 0.05 to 5 parts is preferred. In some embodiments however it may be desirable to use a high concentration of stabiliser particularly where UV protection is also to be provided for the substrate to which the coating is to be applied.

The composition used in the process of the invention preferably includes one or more flame retarding additives. Preferred examples of such additives may be selected from the following:

a: "FYROL 76"* (with and without free radical catalyst such as tertiary butyl hydro-peroxide, cumene peroxide or ammonium persulphate);
b: "FYROL 51"*;
c: "FYROL 6"* and/or "FYROL 66"* with and without catalyst;
  *PRODUCTS OF AKZO CHEMICALS LTD.;
d: "PE-100" and "W-2" (EASTERN COLOR CHEMICALS P/L) of the U.S.A.;
e: "PROBAN"* with and without catalyst such as ammonia or an amine;
  *an ALBRIGHT AND WILSON Aust. PTY. LTD. PRODUCT;
f: "PYROVATEX"* with and without catalyst;
  *a CIBA GEIGY Aust. PTY. LTD. PRODUCT;
g: "PYROSET"* "TOP" and "TKOW" with and without catalyst;
  *PRODUCTS OF CYANAMID Aust. PTY. LTD.;
h: simple phosphates such as mono, di, and triammonium ortho phosphates and their alkali metal equivalents;
i: alkali metal an ammonium sulphamates;
j: alkali metal and ammonium range of poly phosphates;
k: ammonium sulphates;
L: alkali metal and ammonium chromates and dichromates;
m: alkali metal carbonates;
n: alkali metal tungstate;
o: boric acid and borax;
p: organo phosphorus or organo boron compounds;
and mixtures of two or more of the above.

The preferred amount for each system may be determined by experiment. When the additives are used with the resin, the finished product may be fire retarded in accordance with Australian Standard AS1530 Parts 2 and 3.

Particularly preferred fire retarding additives are Fyrol 76, Fyrol 51, PE-100 and W-2 and mixtures thereof. The other flame retardants in "a" to "p" are best used for specific applications and as with all the above retarding additions, their conditions of use are determined by the equivalent level of phosphorus present in the finish. When the Fyrols or PE-100 or W-2 are used, the amounts are 1 to 50% based on the mass of resin solids with 2 to 20% preferred. Generally, the equivalent proportion of elemental phosphorus (and boron if used in combination) in the combination to a level of 4.0% P is needed to achieve the required flame retardancy. However, significantly less may be needed depending on the substrate material. For example some materials may need only 2.0% P. In such cases the exact levels of phosphorus containing compound required are determined exactly by experiment. Thus the range covered from 0.02 to 15% of elemental phosphorus based on the mass of the substrate material to be treated may be used with 0.2 to 4.0% P being the preferred range to achieve flame retardancy. Flame retardants are particularly useful where the coating is to be applied to a textile or natural or synthetic fibre.

As hereinbefore discussed we have found that superior coating properties are provided when the coating is applied to a wet substrate.

In a further embodiment the invention therefore provides a method of coating a substrate comprising:
  providing a radiation curable coating composition comprising a resin component including an unsaturated monomer and an unsaturated oligomer or binder;
  providing a substrate having a wet surface; applying the radiation curable composition to the wet surface; and
  subjecting the coated substrate radiation to thereby cure the coating.

The substrate used in this embodiment is wettable and may for example be a cementitious product or cellulosic product. For example products containing a cement or gypsum binder and reinforcing or filler materials such as compressed cellulose fibre, vermiculite, bagasse, crumbled rubber, corn stalks, rice husks and the like. Also the process provides particularly good results in coating paper and cardboard.

The substrate may be wet by dipping in water or by spraying with water. Surfactants or wetting agents may also be used to improve wetting of the substrate surface. For example conventional wetting agent such as the "Teepol" may be used at the rate of up to 5% w/w, or more in water to improve wetting.

The coating of wet products is particularly preferred in the recycling of paper products. In the recycling process wet reconstituted pulp is dried to produce the recycle paper products. The quantity of the recycled products and their acceptance is however reduced by the presence of colour variation and coloured contaminants in the recycled fibre pulp. The present invention provides a method by which the strength and appearance of the paper is significantly improved by coating the wet recycled paper with a radiation curable composition and curing the coated wet recycled paper by subjecting it to radiation. It is particularly preferred that a coating of high filler loading is used and is applied to the wet surface. The use of filler loadings of 10–200 parts of filler per 100 parts by weight of resin enables excellent coverage of the surface to provide colour uniformity and high quality finish.

The present invention may be utilised in the application of clear finishes, pigmented finishes, undercoats and topcoat finishes.

Preferably the clear finishes will contain a resin component comprising:
  (a) a monomer; and (b) a prepolymer or binder or mixture thereof (the proportion of components other than the resin being expressed on the basis of 100 parts by weight of resin);

0.1 to 60 parts (preferably 0.1 to 5 parts) by weight of a photopolymerization initiator; and optionally one or more components selected from the group consisting of:

(i) filler such as calcite or talc (preferably calcite and talc in a weight ratio of 2:1) in an amount of up to 1000 parts by weight and preferably up to 200 parts by weight (most preferably 50 to 200 parts);

(ii) water in an amount of up to 100 parts by weight and preferably up to 20 parts by weight;

(iii) solvent such as PGMA and methylethylketone in an amount of up to 100 parts by weight and preferably up to 20 parts by weight;

(iv) wetting agents and dispersant such as DYSPER-BYK 110 or 161 in an amount of up to 100 parts by weight and preferably up to 20 parts by weight;

(v) other additives including fluorinated additives and silanes such as FC430 (3M) and Z6020 (The Dow Chemical Company) respectively used to improve flow and gloss in an amount of up to 10 parts by weight and preferably up to 5 parts by weight;

(vi) thermal polymerisation inhibitor such as di-t-butyl-p-cresol (preferably 0.05 to 5 parts by weight); and (vii) light stabiliser such as benzotriazoles included bis-benzotriazoles such as TINUVIN 384, triazines and HALS such as TINUVIN 292, TINUVIN 770 or TINUVIN 384 in an amount of up to 10 parts by weight (preferably 0.05 to 5 parts by weight).

The method of the invention in which the coating composition is heated has the significant advantage that it allows a higher proportion of oligomer to be incorporated than would otherwise be possible. A higher proportion of oligomer allows the properties of the film to be precisely controlled.

Pigmented finishes may comprise the same components as clear finishes described above but will contain a pigment such as titanium dioxide in an amount of up to 1000 parts by weight and preferably from 10 to 200 parts by weight.

The formulations used in coating cementitious products will most preferably contain a pigment in an amount of up to 1000 parts by weight and preferably 10 to 200 parts by weight (most preferably 40 to 200 parts) and a filler in an amount of up to 1000 parts and preferably from 10 to 200 parts (most preferably 40 to 200 parts by weight. In other respects the composition may contain the components as described above for clear coatings.

We have found that adhesion to some substrates is dramatically improved if the coating is applied to the substrate while the substrate is hot. This embodiment of the invention is particularly advantageous for materials which are moulded or formed at elevated temperature.

Some substrates after being treated by conventional processes on line are quite hot at the end of the treatment (for example in the range of from 100 to 150° C.). In many of these applications, UV coatings cure very efficiently and with excellent adhesion if applied at elevated temperatures i.e. immediately on line at the completion of the polymerisation process when the product emerges from the oven. The adhesion is generally far superior to room temperature application followed by UV cure on the same substrates. Materials particularly relevant to this process are plasterboard, styrene polyester resins (particularly those impregnated with glass fibres) plastics like the polyolefins and polystyrene in any form particularly as sheet or foam, and metals (either precoated with paint or bare). In this technique the substrate undergoes a prior, non-related thermal treatment or the like at the completion of which, whilst still on line a UV curable coating is applied hot and passed under the appropriate curing UV lamp system. The coating can be any of the preceding group of UV systems discussed in this patent. As previously discussed, the process is also applicable to EB systems.

In accordance with this embodiment the invention therefore provides a method of coating as hereinbefore described wherein the substrate is also heated preferably to a temperature in the range of 50 to 200° C. and more preferably 50 to 150° C. and most preferably 70 to 150° C. The advantages of applying a radiation curable coating to a hot substrate are particularly great where the substrate is a styrene polymer resins particularly those incorporating glass fibre. Styrene polyester products may be formed by polymerisation in situ within a mould over shaping means such as an extruder. The reaction to form the polymer is exothermic so that the product after processing has a temperature of about 100 to 150° C. We have found that extremely good adhesion is provided if the coating composition is applied to the styrene polymer product before cooling. Without wishing to be bound by theory we believe that the strength of adhesion may be due to the presence of small amounts of unreacted monomers in the product on formation which may become involved in polymerization of the coating to provide a stronger bond with the surface than would otherwise occur. The minor amounts of unreacted monomer which may be about 1 per cent or less may become polymerised during cooling of the product.

We therefore prefer to apply the coating to plastics such as styrene polyester shortly after formation and while the product is at a temperature in the range of from 50° to 150° following the exothermic polymerization process.

The invention in one preferred embodiment therefore provides a method of forming a coated styrene polymer or copolymer product, particularly styrene polyester, comprising forming the product by exothermic polymerisation to provide a hot formed product and applying a radiation curable coating to the hot formed product (preferably at a temperature the range of from 50 to 150° C. (more preferably 70 to 150° C.) and curing the coating by subjecting it to radiation.

The aspects of the coating composition and curing process are generally as hereinbefore described.

EXAMPLE 1

The Example demonstrates the use of the invention in applying clear finishes.

(a) A Clear Gloss finish suitable for exterior or interior use was prepared by combining the following components in the parts by weight listed:

| Components | Parts by Weight |
| --- | --- |
| TMPTA | 30 |
| Aliphatic urethane acrylate | 100 |
| Irgacure 1800 | 6 |
| 2,6-di-t-butyl-p-cresol | 1 |
| Tinuvin 292 | 1 |

The aliphatic urethane acrylate used was ULS 490 or 496 from Tollchem Australia. Other commercially available aliphatic urethane acrylates include CN 963B80 from Sartomer USA or "Ebecryl 284" from UCB Belgium.

(b) A clear gloss finish for interior use was prepared using the composition in the parts by weight listed in part but in which the aliphatic urethane acrylate is replaced with an aromatic urethane acrylate. (UR240 from Tollchem. Aromatic urethane acrylates are preferred for interior use on economic grounds.

(c) A lower gloss clear finish was prepared by combining the following components in the parts by weight listed:

| Components | Parts by Weight |
|---|---|
| TPGDA | 30 |
| Aliphatic urethane acrylate | 100 |
| Irgacure 1800 | 1 |
| 2,6-di-t-butyl-p-cresol | 1 |
| Tinuvin 292 | 1 |
| Calcite (Whiting SSSS) | 25 |
| Talc (T25A) | 46 |
| Dysperbyk 161 | 6 |

(d) A further composition was prepared in accordance with Example 1c with the exception that the aliphatic urethane acrylate was replaced with an aromatic urethane acrylate UR240 available from Tollchem Australia.

Each of the composition 1a to d was heated to a temperature of 70 to 80° and applied to timber by spraying the hot composition onto the timber.

Corresponding compositions were also prepared containing as an additional component the solvent PGMA in an amount of 5 parts by weight.

EXAMPLE 2

This example demonstrates the process of the invention and undercoat formulations.

The undercoat formulation was prepared by combining the following components in the parts by weight listed:

| Components | Parts by Weight |
|---|---|
| TPGDA | 115 |
| Urethane Acrylate* | 36 |
| RCL 666 (TiO$_2$) | 4 |
| Irgacure 1800 | 9 |
| Whiting SSSS | 60 |
| Talc T25A | 100 |
| Dysperbyk 110 | 7.5 |
| Dysperbyk 161 | 7.5 |
| Di-t-butyl-p-cresol | 1.0 |

*Urethane acrylate (aromatic) was used because it is cheaper than the aliphatic equivalent and dries faster. The composition is compatible with water to certain levels, so in a further example 10 parts by weight of water or solvent PGMA was added to the above formula. Epoxy acrylate like Sartomer CNS124A80 or Monocure Sydney product can be used in place of the urethane acrylate, however water compatibility with epoxy acrylates is not as good. Epoxy acrylates are cheaper. Alternatively polyether acrylates, polyester acrylates and polyesters can be used.

It was found that TPGDA may be used without prepolymer but that curing is significantly slower.

After mixing the undercoat was dispersed in a roll mill (tripple roll mill) then heated to 70° C. and sprayed onto the substrate. Curing was carried out using a 300 watts per inch Fusion Camp at 10 meters per minute. The coating may be sanded if necessary.

The compositions of Example 1 and Example 2 were used in coating a number of substitutes at a temperature of 70 to 80° C.

The coatings provided excellent adhesions to each of the substrate tests which included:

1. Timber for flooring and panelling including penius radiata, huon pine, blackbutt, jarra, US redwood, cypress pine, kauri, reconstituted timbers and substrates include particle board, exterior grade MDF and standard MDF, bagasse, corn stalks, rice husks, gypsum, vermiculite mineral fibre board (US Gypsium Interiors) and masonite.
2. Cementitious products including cement panels, blocks, tiles, cement products modified with other materials, particularly fibres such as cellulose and wood, corn stalks, rubber especially recycled car and truck tires, plastic fibres like polypropylene and polyethylene.
3. Plastics in all forms such as sheet, blocks, film and foams especially the polyolefins like polyethylene and polypropylene, polystyrene, PVC, ABS, polyacrylonitrile, polyester, polycarbonate, cellulose acetate, polymethylmethacrylate, nylon, polyacetal, PET.
4. Textiles including cotton, polyester, wool, nylon, dacron and mixtures thereof, leather, acrylics.
5. Glass, ceramics including tiles.
6. Metals, zinc, steel, copper, brass, stainless steel, zinc alum, aluminium, all types of iron such as galvanised iron and cast iron, tinplate, zinc, diecast metals.

EXAMPLE 3

Coating of Cementitious Products

This example demonstrates the use of the method of the inventions in coating of cementitious products.

A composition was prepared by combining the following components in the parts by weight listed.

| Components | Parts by Weight |
|---|---|
| HDDA | 90 |
| Aliphatic urethane acrylate | 28 |
| RCL 666 (TiO$_2$) | 14 |
| Irgacure 1800 | 8 |
| Whiting SSSS | 53 |
| Talc T25A | 89 |
| Di-t-butyl-p-cresol | 1 |
| Tinuvin 292 | 1 |
| Dysperbyk 110 | 7 |
| Dysperbyk 161 | 7 |
| Tinters - Yellow (approx.) | 1.84 |
| - Black (approx.) | 0.12 |
| - Red (approx.) | 0.1 |

The composition described was heated to 70 to 75° C. and applied at a temperature of 70 to 75° C. to a compressed cellulose fibrous cement board available under the brand name "Hardiplank" from James Hardie Pty. Ltd. of Sydney Australia at a thickness of about 30–40 microns. After application the coating was cured on the surface of the board at the rate of 20 meters/minute using a 300 watt per inch Fusion lamp. After curing the coating is ready for field installation. The coating was over reacted with a decorative top coat using water based acrylic paint sold under the brand name "Weathershield" by Dulux Australia Limited although any other solvent or exterior pigmented finish may be used.

Two further compositions corresponding to the above description were prepared with the addition in one case (Example 3a) 10 parts by weight of PGMA and in the other case (Example 3b) 10 parts by weight of water.

The difference between process (a) with PGMA and (b) with water was after curing a trace of solvent is retained by the film on the board. This gradually evaporates but can leave a slightly softer film than when water is used or no solvent is used. This softer film may lead to subsequent "blocking" between sheets if they are stacked immediately after curing. Water did not lead to this problem since it is absorbed by the porous substrate and not the film. In non porous substrates the water is repelled by the highly cross-linked film. Water tends to give better flow to the film than PGMA because of volatillisation considerations. This specific formulation was developed for fibrous cement substrates. It is a flat exterior finish. An aliphatic urethane was chosen for durability. If flat exterior finishes are required would it is a significant advantage to use the aliphatic urethane. The predominant needs of exterior finishes are durability, semi gloss and gloss. UV curable coatings based on aromatic urethanes and epoxy acrylates may be preferred for interior coatings where weathering is not such a concern.

EXAMPLE 4

Pigmented High Gloss Durable Finish

This Example demonstrates the case of the method of the invention in coating of cementitious products with a high gloss durable finish.

a) A composition was prepared by combining the following components in the parts by weight listed.

| Components | Parts by Weight |
| --- | --- |
| HDDA | 40 |
| Aliphatic urethane acrylate ULS 490 | 104 |
| Irgacure 1800 | 7 |
| RCL 666 (TiO$_2$) | 10 |
| Di-t-butyl-p-cresol | 1 |
| Tinuvin 292 | 1 | b) A further composition was prepared containing the components in the parts by weight listed in part (a) with the addition of 10 parts by weight of water.

c) A further composition was prepared containing the components in the parts by weight listed in part with the addition of 10 parts by weight of PGMA.

In each case the mixture is ground in a triple roll mill or the like then is sprayed at 70–75° C. or above, coated on to CFC Hardiboard which had previously been undercoated by UV process already discussed or by conventional solvent based undercoat which coatings had been sanded and cleaned of dust. Product is then cured at 20 meters/minute under Fusion lamp of 300 Watts/inch to give a high gloss finish. Note that these topcoats are for use either alone (i.e. direct on to untreated or unprinted board) or over undercoat or primer which is the more frequently used method. Coatings of 75 microns or more can readily be achieved in one coat.

EXAMPLE 5

Pigmented Low Gloss Durable Finish

This Example demonstrates the use of the method of the invention in coating cementitious products to provide low gloss durable finish.

| Components | Parts by Weight |
| --- | --- |
| HDDA | 40 |
| Aliphatic urethane acrylate ULS 490 | 104 |
| Irgacure 1800 | 10 |
| RCL 666 (TiO$_2$) | 10 |
| Whiting SSSS | 30 |
| Talc T25A | 42 |
| Di-t-butyl-p-cresol | 1 |
| Tinuvin 292 | 1 |
| Dysperbyk 110 | 4 |

The coating was applied in accordance with the procedure in Example 4 Part C.

The lower gloss properties of the composition are achieved by the use of a increased ratio of whiting plus talc to the resin in the formulation. The required level of gloss can be achieved by adjusting this ratio.

In order to improve flow and gloss of the two gloss formulations above, small percentages (0.1%) of flow, slip and gloss aids such as FC 430 and Z6020 may be added. The topcoat can be applied to board which has been previously undercoated with UV cured material (or conventional materials) then sanded or on unfilled board. The former is preferred. Coatings of 75 microns or more can readily be achieved in one application.

As with the high gloss durable finish optionally up to 10 parts by weight of PGMA (or the like) and/or 10 parts by weight of water may be added to reduce the viscosity of the formulation if needed.

EXAMPLE 6

Coating of Fibre Glass

This example demonstrates the use of the invention in coating mixed polyester resin. A mixture of polyester resin (typical supplier, An3ol paint Co., Sydney), styrene monomer (Huntsman Chemicals, Melbourne) and glass fibre with catalyst are poured onto "Melinex" fibre (ICI Australia, Melbourne) containing UV stabiliser held in a conveyor belt and passed into an oven initially at approximately 40° C. then with the heat gradually increased to sustain the exothermicity of the polymerisation to approximately 130° C. At this point and temperature, the sheet of fibre glass or "Melinex" emerges from the oven and, as soon as practical (usually several meters), a coating of the urethane acrylate/TPGDA resin formulation of Example 1 preheated to 70–80° C. is sprayed or brushed onto the hot fibre glass sheet (≈80–90° C.). This coated sheet is then passed under a UV lamp as previously described (Fusion, 300 watts/inch) at typical line speeds of 10 meters/min. The coating is cured immediately with excellent adhesion. If the above urethane acrylate/TPGDA coating is applied hot (70–80° C.) to the fibre glass sheet off line ie. away from the oven with the fibre glass sheet at room temperature, irreproducibility in adhesion of coating to the fibre glass is achieved. In some trials at room temperature (about one in 20) reasonable adhesion is obtained but the process is inconsistent and the reason for this improducibility is not known. However, these problems are not encountered with the application on line from the oven described above, all examples cure with excellent adhesion. These cured samples were then placed in the QEB weatherometer and also exposed at Allunga Paint Station in Queensland and after six months (≈10 years exterior conditions) show no deterioration. With respect to the excellent adhesion achieved on the hot fibre glass on line, it is known that as the fibre glass emerges from the oven, a small percentage of styrene (≈1%) remains unreacted and this polymerisation is completed as the substrate cools to room temperature. During coating and UV curing it is suggested that the residual styrene copolymerises with the urethane acrylate (TPGDA) of the coating to give a graft copolymer at the surface of the fibre gloss, thus yielding strong adhesion. This occurs with either clear or pigmented coatings at any glass level.

EXAMPLE 7

Example of Flame Retardant Compositions

For the textile area particularly and also all celluloses such as paper and wood, also other substrates, the ability to flame retard the coating could be very valuable. For this purpose a piece of cotton (4 cm/15 cm) is sprayed with the pigmented high gloss durable finish (at 70–80° C.) in Example 2. Prior to spraying 22 grams of Fyrol 51 flame retardant (ex AK20, 15% by weight of resin component) is added to the formulation in Example 2. After spraying, the coating is cured under a UV lamp (Fusion 300 W/inch) at 5 meters/minute. The resulting fibre is then subjected to the standard AS 1530 Parts 2 and 3 test which it passes by sustaining a 12 second burn test with "standard flame". The above trial is repeated using 8 g of PE 100 (Eastern Chemicals, 6% by weight of resin component) in place of Fyrol 51. The finished product is flame retarded as the subsequent AS 1530 parts 2 and 3 flame test shown.

EXAMPLE 8

Coating of Wet Substrates

This example demonstrates the use of the method of the invention in which the radiation curable composition is applied to a wet substrate.

It was found that if the substrate such as cementitious or cellulose product is pre-wet with water, UV cured materials such as are described in this patent can be directly applied to the board whilst wet with water and then UV cured at line speeds relevant to the lamp intensity e.g. 20 meters/minute with a 300 Watts/inch Fusion lamp. A major advantage of the pre-wet process is that the amount of coating required is usually lower in the presence of water since absorption of coating into the substrate is minimised.

The composition of each of Examples 3 and 4 were applied to "Hardiplank" board which had been sprayed with water.

With the gloss coatings the water pre-treatment is particularly useful since no undercoat is needed if the board is wet and direct coating (clear or pigmented finishes) on to pre-wet board, such as Hardiboard, gives a gloss finish if required. For some substrates, a conventional wetting agent (e.g. Teepol 1% by weight of total coating materials) may need to be added to the water to improve pre-wetting.

What is claimed is:

1. A method of preparing a coated substrate comprising:
   providing a radiation curable coating composition comprising a resin component including an unsaturated monomer and at least one of an unsaturated oligomer, binder or mixture thereof,
   a pigment and optionally a filler wherein the total of pigments and filler constitutes at least 10 parts by weight based on 100 parts by weight of resin component;
   heating the radiation curable coating composition to provide a hot coating composition of temperature of from 35 to 150° C.;
   applying the hot radiation curable composition to the surface of the substrate at a temperature in the range of from 35 to 150° C. to the substrate; and
   subjecting the applied radiation curable coating to radiation to thereby cure the coating.

2. A method according to claim 1 wherein the radiation curable coating composition is heated to a temperature in the range of from 50 to 120° C.

3. A method according to claim 1 wherein the radiation is ultraviolet light radiation.

4. A method according to claim 1 wherein the radiation curable coating composition comprises a pigment or filler present in an amount such that the total filler and pigment constitutes at least 40 parts by weight based on 100 parts by weight of the resin component.

5. A method according to claim 4 wherein the radiation curable coating composition comprises a photoinitiator component comprising a combination of an acyl phosphine oxide initiator and an α-hydroxy-α,α-di-substituted acetophenone initiator.

6. A method according to claim 5 wherein photoinitiator component comprises a mixture of 1-hydroxycyclohexylphenylketone and bis-(2,6-dimethyloxybenzoyl)-2,4,4-trimethylpentyl phosphine oxide in a weight ratio of from 10:1 to 1:10.

7. A method according to claim 4 wherein the radiation curable coating composition comprises a photoinitiator in an amount of from 0.1 to 60 parts by weight based on 100 parts by weight of resin.

8. A method according to claim 1 wherein the radiation curable coating composition comprises a urethane acrylate prepolymer; from 50 to 1000 by weight of pigments and/or fillers and water in an amount of from 5 to 100 parts by weight based on 100 by weight of resin component.

9. A method according to claim 1 wherein the radiation curable coating composition is applied to a wet substrate.

10. A method according to claim 9 wherein the substrate is selected from cementitious products and cellulose fibre products.

11. A method according to claim 1 wherein the substrate is recycled paper and the coating comprises in the range of from 40 parts to 200 parts of the total of filler and pigment.

12. A method according to claim 1 wherein the substrate is styrene polymer product and said radiation curable coating is applied to the polymer product which is hot as a result of heat generated during polymerization to form the product.

13. A method according to claim 12 wherein the radiation curable coating is applied to the styrene polymer product when said product is at a temperature in the range of from 50 to 150° C.

14. A radiation curable coating composition comprising:
   a resin component comprising a monomer and at least one of a prepolymer and a binder polymer, a pigment and optionally a filler present in an amount of at least 40 parts by weight of the total of pigment and filler per 100 parts by weight of resin component;
   and a photoinitiator component comprising a combination of an acyl phosphine oxide initiator and an α-hydroxy-α,α-di-substituted acetophenone initiator.

15. A radiation curable coating composition according to claim 14 wherein the composition comprises in the range of from 50 to 200 parts of the total of fillers and pigments by weight based on 100 parts by weight of resin component.

16. A radiation curable coating composition according to claim 14 wherein the weight ratio of acyl phosphine oxide to a α-hydroxy-α,α-di-substituted acetophenone initiator is in the range of from 1:10 to 10:1.

17. A radiation curable coating composition according to claim 14 wherein the acyl phosphine oxide is bis-(2,6-dimethoxybenzoyl)-2,4,4-trimethylpentyl phosphine oxide and the α-hydroxy-α,α-di-substituted acetophenone is 1-hydroxycyclohexyl phenyl ketone.

18. A radiation curable coating composition according to claim 14 wherein the resin composition comprises a monomer component comprising one or more compounds comprising a plurality of acrylite or methacrylate functional groups and the prepolymer component comprising an aliphatic or aromatic urethane acrylate.

19. A method of coating a substrate comprising:
providing a radiation curable coating composition comprising a monomer and a prepolymer or binder;
providing a water-wettable substrate having a surface which has been wet with water;
applying the radiation curable composition to the wet surface; and curing the coating by application of radiation.

20. A method according to claim 19 wherein the substrate is selected from cementitious products and cellulosic products.

21. A method according to claim 19 wherein the substrate is reinforced cement board.

22. A method according to claim 1 wherein the radiation curable coating comprises at least 10 parts of pigment base on 100 parts by weight of resin component.

* * * * *